Patented Jan. 3, 1950

2,493,372

UNITED STATES PATENT OFFICE 2,493,372

BRAZING FLUX COMPOSITION

Harold R. Williams, Cleveland, Ohio

No Drawing. Application November 8, 1946,
Serial No. 708,805

2 Claims. (Cl. 148—24)

This invention relates to improvements in fluxing and alloying compositions used in the art of joining practically all metals by low temperature methods, such as brazing.

Brazing, as generally understood in the art, consists in joining metal parts by fusing a lower melting point metal between them without appreciable fusion of the parent metal. Brazing is to be distinguished from the customary soft soldering operation, which is conducted at much lower temperature, the molten solder being supplied along with a flux to the areas to be joined, and a certain amount of mechanical agitation of both flux and solder usually being necessary; in brazing, one must usually rely on the action of the flux and molten metal.

In the brazing operation of my invention, a slight amalgamation, not fusion, and slight penetration of the grain structure of the parent metal by a "sweating down" of the braze alloy into the pores of the parent metal, takes place, whereby a certain interlock of the alloy composition and the parent metal is achieved, which strengthens the bond between said metals.

Due to the higher temperatures employed in brazing, as referred to, the usual fluxes employed are subject to the objection that they are unstable at the high temperatures employed and either vaporize, decompose or run away from the heat of braze. Others carbonize and deposit residues which are undesirable. Still others do not effect a satisfactory joint. A satisfactory flux, prior to my composition, has not, in fact, been achieved in the prior art which satisfactorily combines an efficient cleaner for the surfaces, good adherence, assists maximum flow and alloying of the brazing agent between the joints, and affords proper protection to the surfaces against re-oxidation, corrosion and harmful residue.

According to usual brazing practice, borax fluxes have been employed.

Commonly, heavy metal chloride fluxes have been employed in the lower soldering field, and borate fluxes in the higher temperature brazing fields since the chloride fluxes, for instance, have a flow point below that of aluminum and silver and borax or boric acid fluxes require temperatures of 1400° F. or higher which are above the flow temperature of silver-copper alloys, and it has been recognized that an efficient brazing flux must have a melting point below but adjacent to the melting point of the brazing alloy.

Various halogens have been proposed for use in the field of halide fluxes and combinations of chlorides, fluorides, etc., used. Where liquid fluxes of the so-called "halide" type have been employed in the soldering field, for instance, it has been found that such fluxes, although dissolving the oxide which forms as a film upon the metal and which would prevent the solder from adhering, deposit a heavy corrosive deposit which, in turn, is even more difficult to remove than the oxide removed thereby. Such fluxes further are subject to the objection that, since they are hygroscopic in character, they deteriorate rapidly.

It has further been found impossible to combine such fluxes with powdered metal alloy particles whereby a combined flux and alloy composition might be achieved since such chloride and fluoride fluxes, when combined according to the prior art, attack the metal powder and cause complete corrosive or electrolytic action in the braze.

Various vehicles for the fluxing salts employed, as for example, zinc chloride, etc., have been suggested to assist in the fluidity or spread thereof and aqueous solutions have further been employed, as well as waxes, oils, paraffins, Vaseline, resin, etc., therefor.

I have found that when halides or boron-fluorine containing compounds, non-gaseous in character, are combined with compounds containing only carbon, hydrogen and oxygen, such as the oxidation products of hydrocarbons, that a very satisfactory and desirable flux is achieved for use in the brazing field and that such flux may be united with powdered metal particles to form a combined flux and alloy composition.

By the term "compounds containing only carbon, hydrogen and oxygen," which have been defined above as the oxidation products of hydrocarbons, I mean to include alcohols, mono- or poly-hydric, ethers, ketones, organic acids, or combinations of these groups, such as esters.

Examples of such compounds which I have wound particularly effective include glycols, glycerols, mono-, di-, tri-, and tetra-ethylene glycols, ethylene glycol mono-methyl, mono-ethyl, mono-isopropyl and mono-butyl ethers, or the di-ethylene glycol compounds of the same alkyl ethers or with aromatic ethers, acetates, such as amyl acetate, have also been employed with highly satisfactory results.

I have found that such compounds, being non-aqueous and non-hygroscopic in character, avoid any moisture absorption of active chemicals; are non-acid; possess a high temperature fluidity; act as a high temperature lubricant, being an "oily" type paste-like product; clean, cover and protect the surfaces of the braze; melt below the temperature of the metal being brazed; reduce the surface tension between the parent metal surface and the brazing alloy; and assist in the flow of the braze alloy towards the braze joint as the brazing temperature is attained.

A satisfactory flux for use in the lower temperature brazing field, as aluminum or the like, has been prepared by combining one or more of the fluorides, preferably those of the light metals, such as sodium, potassium, or lithium, or a complex fluoride, such as cryolite or cryolithionite, with a relatively heavy metal fluxing agent, such as anhydrous zinc chloride or other preferred fluxing salt, and combining the same with a "compound containing only C, H and O."

A preferred compound of this type flux for use particularly in this lower temperature brazing field comprising aluminum or the like brazing comprises zinc chloride, ammonium chloride, cryolithionite and Carbitol, which is a trade name for diethylene glycol monoethyl ether.

The following preferred proportions have been utilized in this flux:

| | |
|---|---|
| $ZnCl_2$ | 7 |
| $NH_4Cl$ | 2 |
| Cryolithionite | 1 |
| Carbitol | 40 |

To this fluxing agent is preferably added powdered metal particles in equal quantities, said particles constituting the ordinary brazing alloy such as, silver, silver-containing alloys, copper, copper-containing alloys, etc., or ordinary tin and lead solder particles.

In the lower temperature brazing field, I have found that it is highly advantageous to utilize the well known zinc chloride or usual fluxing salts to secure a better cleaning action and I find that said cleaning action is unimpaired by the presence of the "compounds containing only carbon, hydrogen and oxygen," as such compounds retard the etching effect of the zinc chloride to such a degree that too deep penetration of the aluminum surfaces, causing perforations, etc., is avoided although a slight amalgamation, as above described, with the parent metal results.

The preferred vehicle of my invention appears to suspend the fluxing salt and braze alloy in uniform distribution throughout the same.

I have noted that the zinc of the zinc chloride, when reduced by brazing heat, seems to alloy the surface of the parent metal and whatever brazing particles be supported in the vehicle will lock with the alloy of the zinc and parent metal. Since the compounds employed are capable of withstanding relatively high temperatures and melt below the melting temperature of the parent metals, the cleaning action takes place before brazing begins and when the heat approaches the melting point of the parent metal, the surfaces to be joined are protected against re-oxidation; at the braze point, the alloyed zinc, parent metal and braze particles run toward the braze joint and such brazed joint is strong enough to withstand any twisting torsional stress to which it may be subjected, the strength, in fact, surpassing that of the parent metal.

In the higher temperature brazing field, I have found that the boron-fluoride containing compounds of fluoro-borates are most efficient in this field in combination with the compounds containing only carbon, hydrogen and oxygen.

A preferred compound of this type flux in the higher temperature brazing field comprises sodium fluoride, borax and boric acid in combination with a glycol. The following representative proportions of weight have been used:

| | |
|---|---|
| $H_3BO_3$ | 22 |
| $Na_2B_4O_7$ | 3 |
| $NaF$ | 1 |
| Dimethoxytetraglycol | 24 |

To this fluxing agent also may be added powdered metal braze alloy particles in equal quantities and these form "oily" paste-like flux and braze compositions. Rosin, castor oil or resins may further be added to the compounds without varying the effectiveness thereof.

I have described herein the essential compounds and formulas for fluxing and alloying brazing compounds but I am aware that the examples given are simply illustrative and that various proportions etc., may be used without, however, departing from the spirit of my invention and the scope of the appended claims.

I claim:

1. A brazing flux composition comprising substantially 7% zinc chloride, 2% ammonium chloride, 1% cryolithionite and 40% diethylene glycol monoethyl ether.

2. A brazing flux composition comprising substantially 7% zinc chloride, 2% ammonium chloride, 1% cryolithionite and 40% diethylene glycol monoethyl ether, braze alloy particles being combined with said compound flux, in an amount substantially equal to 50% of the entire weight of the composition.

HAROLD R. WILLIAMS.

REFERENCES CITED

The following references are of record in the file of this patent:

UNITED STATES PATENTS

| Number | Name | Date |
|---|---|---|
| 2,379,234 | Horowitz | June 26, 1945 |
| 2,403,110 | Miller | July 2, 1946 |

FOREIGN PATENTS

| Number | Country | Date |
|---|---|---|
| 324,611 | Great Britain | Jan. 30, 1930 |
| 489,641 | Germany | Jan. 18, 1930 |